(12) United States Patent
Xing et al.

(10) Patent No.: US 10,416,890 B2
(45) Date of Patent: Sep. 17, 2019

(54) APPLICATION EXECUTION ENCLAVE MEMORY PAGE CACHE MANAGEMENT METHOD AND APPARATUS

(71) Applicant: Intel Corporation, Santa Clara, CA (US)

(72) Inventors: Bin Xing, Hillsboro, OR (US); Mark W. Shanahan, Raleigh, NC (US); Bo Zhang, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 14/849,222

(22) Filed: Sep. 9, 2015

(65) Prior Publication Data

US 2017/0068455 A1    Mar. 9, 2017

(51) Int. Cl.
*G06F 3/06* (2006.01)
*G06F 12/0875* (2016.01)
*G06F 12/0893* (2016.01)

(52) U.S. Cl.
CPC .......... *G06F 3/0605* (2013.01); *G06F 3/061* (2013.01); *G06F 3/0622* (2013.01); *G06F 3/0631* (2013.01); *G06F 3/0673* (2013.01); *G06F 12/0875* (2013.01); *G06F 12/0893* (2013.01); *G06F 2212/1016* (2013.01); (Continued)

(58) Field of Classification Search
CPC ........... G06F 3/0605; G06F 12/0875; G06F 12/0893; G06F 3/061; G06F 3/0622; G06F 3/0631; G06F 3/0673; G06F 2212/1016; G06F 2212/1052; G06F 2212/1056; G06F 2212/151; G06F 2212/45

See application file for complete search history.

(56) References Cited

U.S. PATENT DOCUMENTS 9,128,849 B2 * 9/2015 Hendry ............... G06F 12/0831
2005/0198464 A1 * 9/2005 Sokolov ................ G06F 12/10
                                                                711/203

(Continued)

FOREIGN PATENT DOCUMENTS

WO    WO2014139125 A1    9/2014

OTHER PUBLICATIONS

International Search Report and Written Opinion dated Nov. 4, 2016 for International Application No. PCT/US2016/044319, 15 pages.

*Primary Examiner* — David Yi
*Assistant Examiner* — Zubair Ahmed
(74) *Attorney, Agent, or Firm* — Schwabe, Williamson & Wyatt, P.C.

(57) ABSTRACT

Apparatuses, methods and storage medium associated with application execution enclave cache management, are disclosed herein. In embodiments, an apparatus may include one or more processors with supports for application execution enclaves; cache memory coupled with the one or more processors to be organized into a plurality of cache pages; and an exception handler to be operated by the one or more processors to handle cache page fault exceptions, wherein to handle cache page fault exceptions includes to handle a cache page fault triggered to request additional allocation of one or more cache pages to an execution enclave of an application. Other embodiments may be described and/or claimed.

25 Claims, 7 Drawing Sheets

(52) U.S. Cl.
CPC ............... *G06F 2212/1052* (2013.01); *G06F 2212/1056* (2013.01); *G06F 2212/151* (2013.01); *G06F 2212/45* (2013.01)

(56) References Cited

U.S. PATENT DOCUMENTS

| | | | |
|---|---|---|---|
| 2012/0159184 A1* | 6/2012 | Johnson | G06F 21/6218 |
| | | | 713/189 |
| 2013/0232315 A1 | 9/2013 | Tian et al. | |
| 2014/0189326 A1* | 7/2014 | Leslie | G06F 9/30047 |
| | | | 712/225 |
| 2014/0237199 A1* | 8/2014 | Murray | G06F 8/52 |
| | | | 711/159 |
| 2014/0304559 A1* | 10/2014 | Ginzburg | G06F 9/30036 |
| | | | 714/57 |
| 2016/0048401 A1* | 2/2016 | Bhat | G06F 9/45558 |
| | | | 718/1 |

\* cited by examiner

APPLICATION EXECUTION ENCLAVE MEMORY PAGE CACHE MANAGEMENT METHOD AND APPARATUS

TECHNICAL FIELD

The present disclosure relates to the field of computing. More particularly, the present disclosure relates to the application execution enclave memory page cache management method and apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Security, protection from malicious software, has emerged as a major concern of the computing art. It is expected that processors, e.g., some processors from Intel® Corporation of Santa Clara, Calif., will begin to provide support for isolated/protected execution environments to individual applications (also referred to as application execution enclaves or simply, enclaves). Accesses to the enclave memory areas will be limited to codes resident in the enclaves only. Codes outside the enclave will have no access to enclave memory areas. For Intel® processors, the technology is currently known as SGX (Software Guard Extensions). For further information, see Intel® Software Guard Extensions Programming Reference, dated October, 2014.

It is expected that the isolation supports will include support for enclave dynamic memory management, allowing cache pages to be dynamically added to or removed from an enclave on an as needed basis. One proposed approach contemplated for dynamically augmenting an enclave with additional cache pages includes having the enclave send a request to the privileged OS kernel or a privileged driver for a certain number of cache pages to be mapped to a specified virtual address. Since, for security reasons, calls to system services from enclaves are not allowed, an enclave would have to make the request through the non-isolated portion of an application.

In response, the privileged software (i.e., the OS kernel or the privileged driver) will use the support features provided by the processor (e.g., the EAUG instruction for SGX) to allocate and map the required number of cache pages to the requesting enclave. Similar to the request, the privileged software would communicate completion of the allocation and mapping to the enclave through the non-isolated portion of the application. On notification of completion of the allocation and mapping, the enclave is to execute an acknowledgement (e.g., the EACCEPT instruction for SGX) for each newly added cache page.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
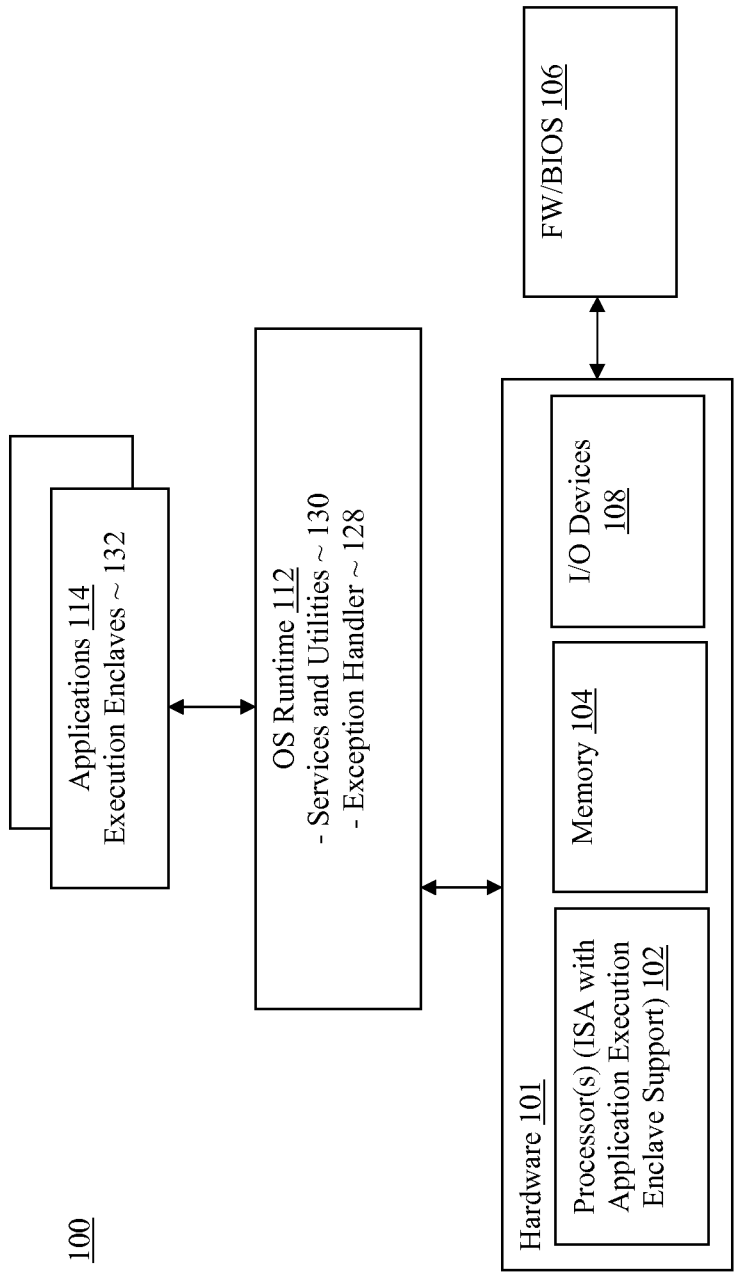
FIG. 1 illustrates a computing device having the application execution enclave cache management technology of the present disclosure, according to various embodiments.

Apparatuses, methods and storage medium associated with application execution enclave memory page cache management, are disclosed herein. In embodiments, an apparatus may include one or more processors with supports for application execution enclaves; memory coupled with the one or more processors to be organized into a plurality of memory pages; and an exception handler to be operated by the one or more processors to handle memory page fault exceptions, wherein to handle memory page fault exceptions includes to handle a memory page fault triggered to request additional allocation of one or more memory pages to a memory page cache of an execution enclave of an application.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a computing device having the power management package provision technology of the present disclosure, according to various embodiments, is shown. As illustrated, in embodiments, computing device 100 may include hardware 101, firmware (FW)/basic input/output services (BIOS) 106, OS runtime 112 and applications 114, operatively coupled with each other as shown. Hardware 101 may include one or more processors 102 with instruction set architectures (ISA) that support application execution enclaves (i.e., isolated/protected execution areas), and memory 104 having a number of memory pages. Applications 114 may have corresponding execution enclaves 132 having respective memory page caches. OS runtime 112 may include a number of services and utilities 130. In particular, services and utilities 130 may include an exception handler 128 configured to handle one or more exceptions, including exceptions intentionally or unknowingly triggered to request one or more additional memory pages be dynamically added to a memory page cache of an application execution enclave 132. An example of an unknowingly triggered request may be an exception triggered by an unexpected overflow of a heap or stack of an application execution enclave, or violation of memory protection. These and other aspects related to application execution enclave memory page cache management will be further described below with references to FIGS. 2-5.

Except for their ISA that supports application execution enclaves, processor(s) 102 may otherwise be any one of a number of processors known in the art, having one or more processor cores. Memory 104 may be any known volatile or non-volatile memory in the art, suitable for storing data. Memory 104 may include a hierarchy of cache memory and system memory. Both the cache and system memory may be respectively organized into cache pages and memory pages. In embodiments, hardware 101 may further include I/O devices 108, or other elements (not shown). Examples of I/O devices 108 may include communication or networking interfaces, such as Ethernet, WiFi, 3G/4G, Bluetooth®, Near Field Communication, Universal Serial Bus (USB) and so forth, storage devices, such as solid state, magnetic and/or optical drives, input devices, such as keyboard, mouse, touch sensitive screen, and so forth, and output devices, such as, display devices, printers, and so forth.

FW/BIOS 106 may be any one of a number FW/BIOS known in the art. Except for exception handler 128 configured to handle exceptions triggered to request additional memory pages be dynamically allocated and mapped for a memory page cache of an application enclave, OS runtime 112 may likewise be any one of a number of OS known in the art, e.g., the Windows OS from Microsoft® Corporation. Applications 114, exception of usage of execution enclaves, may likewise be any one of a number of applications known in the art.

Figure 2:
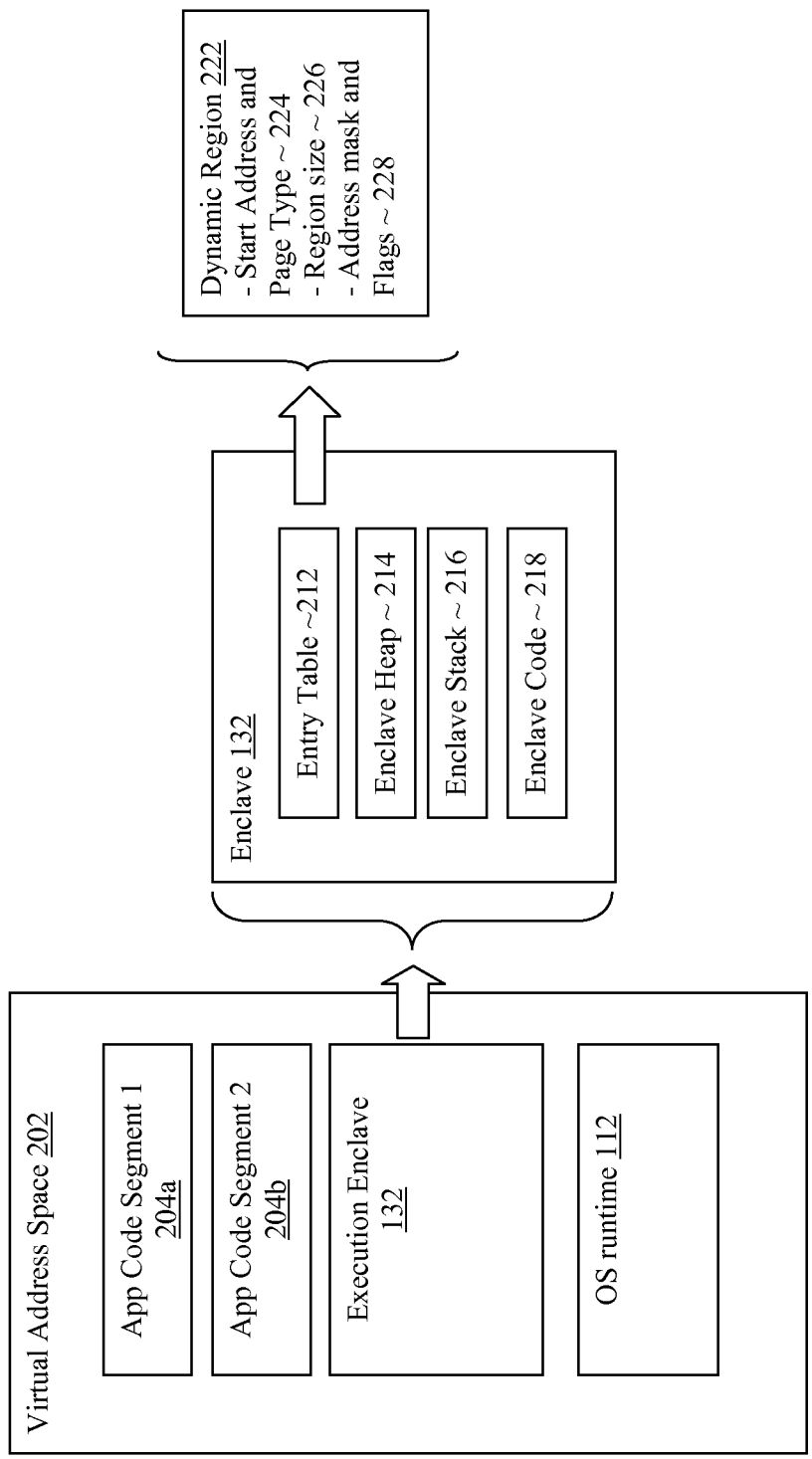
FIG. 2 illustrates a virtual address space view of an application, according to various embodiments.

Referring now to FIG. 2, wherein a virtual address space view of an application, according to various embodiments, is illustrated. As shown, within virtual address space 202 may be OS runtime 112, isolated/protected execution enclave 132 having its own memory page cache, the non-isolated application code segments 204a-204b. Execution enclave 132 may include entry table 212, enclave heap 214, enclave stack 216, and resident enclave code 218. Entry table 212 may include information about various resources within execution enclave 132, dictating which memory pages to accept. In embodiments, entry table 212 may further include information about locations of dynamic regions 222 of execution enclave 132. Dynamic regions 222 of an execution enclave 132 may specify address ranges of the execution enclave 132 where new memory pages may be mapped. In embodiments, information about a dynamic region 222 may include the starting address of the dynamic region and/or page type 224. Page type 224 may include parameters to be provided to an execution conclave support instruction to augment the memory page cache of an execution enclave, e.g., the EAUG instruction of SGX. Examples of these parameters may include, but are not limited to, read and/or write permissions. Region size 226 may specify a number of memory pages the dynamic region can hold. Address mask and flags 228 may include information on buffer and/or code/data section/segment alignment within the dynamic region (address mask), and information on the growth direction for adding memory pages. In embodiments, a value 0 may denote the new memory pages are to be mapped growing upward (with increasing address values), and a value of 1 may denote the new memory pages are to be mapped growing downward (with decreasing address values).

Enclave heap 214 and enclave stack 216 may be similar to conventional software heap and stack, except they are within the enclave's memory page cache, thus isolated and protected, and may be accessed by enclave code 218 resident within enclave 132 only. As described earlier, on entry, execution may flow within enclave code 218, and on completion, exit back to the non-isolated application code segments 204a-204b. Enclave code 218 is not permitted to make any direct calls to OS services and utilities 130 for services. For security/protection, such calls must go through the hosting application 114. Before further describing the present disclosure, it should be noted that while for ease of understanding, only one execution enclave 132 is shown within virtual address space 202, the present disclosure is not so limited. Virtual address space 202 of application 114 may include one or more execution enclaves 132 (each having its own memory page cache).

Figure 3:
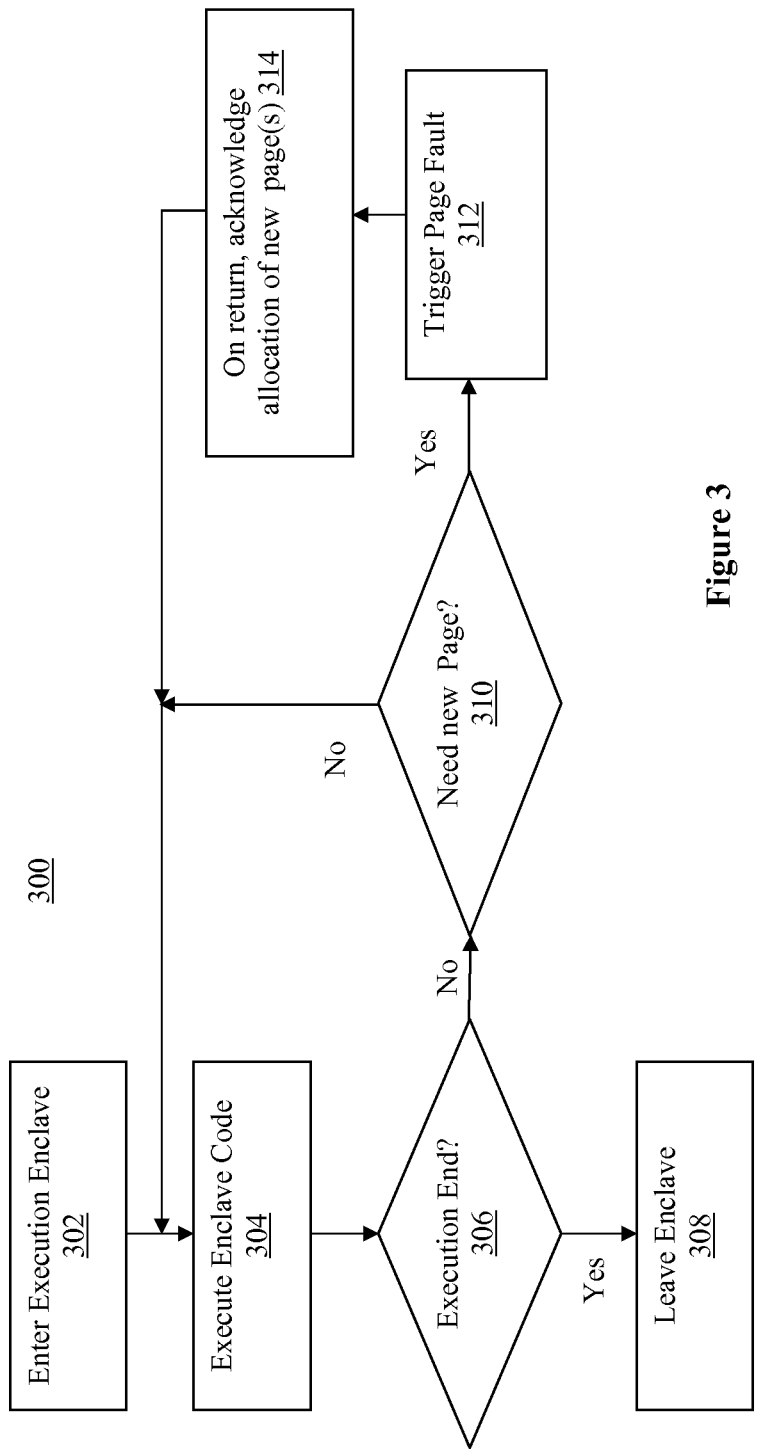
FIG. 3 illustrates an example process for dynamically adding one or more cache pages to an application execution enclave, according to the various embodiments.

Referring now to FIG. 3, wherein an example process for dynamically adding one or more memory pages to a memory page cache of an application execution enclave, according to the various embodiments, is illustrated. As shown, process 300 for dynamically adding one or more memory pages to a memory page cache of an application execution enclave may include operations performed at blocks 302-312. The operations at blocks 302-312 may be performed, e.g., by execution conclave 132 of FIG. 1.

Process 300 may start at block 302. At block 302, execution of an application may be transferred into one of its execution conclave. On entry, a block 304, resident conclave code may be executed. At some point, while execution continues ("No" branch of block 306), a need may arise for one or more additional memory pages added to the memory page cache of the execution enclave ("Yes" branch of block 310). The need may arise for any one of a number of reasons, e.g., a realization of needs for additional memory space, or an unexpected overflow of the enclave's heap or stack. If the need for one or more additional memory pages does not arise ("No" branch of block 310), process 300 may return to block 304 and continue therefrom as earlier described.

If the need for one or more additional memory pages ("Yes" branch of block 310) arises, at block 312, the application enclave may intentionally or unknowingly trigger a memory page fault. In embodiments, the application enclave may intentionally trigger a memory page fault by issuing a memory page allocation acknowledgment for a vacant address to which the application enclave wants one or more memory pages be added. In SGX embodiments, the memory page fault may be intentionally triggered by issuing the EACCEPT instruction for a vacant address to which the application enclave wants one or more cache pages starting to be added.

On return, i.e., handling of the memory page fault (for requesting one or more additional memory pages), at block 314, the execution conclave may acknowledge allocation of the new memory pages. In SGX embodiments, the execution conclave may execute (retry in the case of intentional trigger of the memory page fault) the EACCEPT instruction.

On acknowledgment of the newly added memory page(s), process 300 may return to block 304, and continue therefrom as earlier described. Eventually, execution within the execution conclave completes ("Yes" branch of block 306), then at 308, execution may exit the enclave, and return to one of the non-isolated segments of the application. Process 300 may end.

Figure 4:
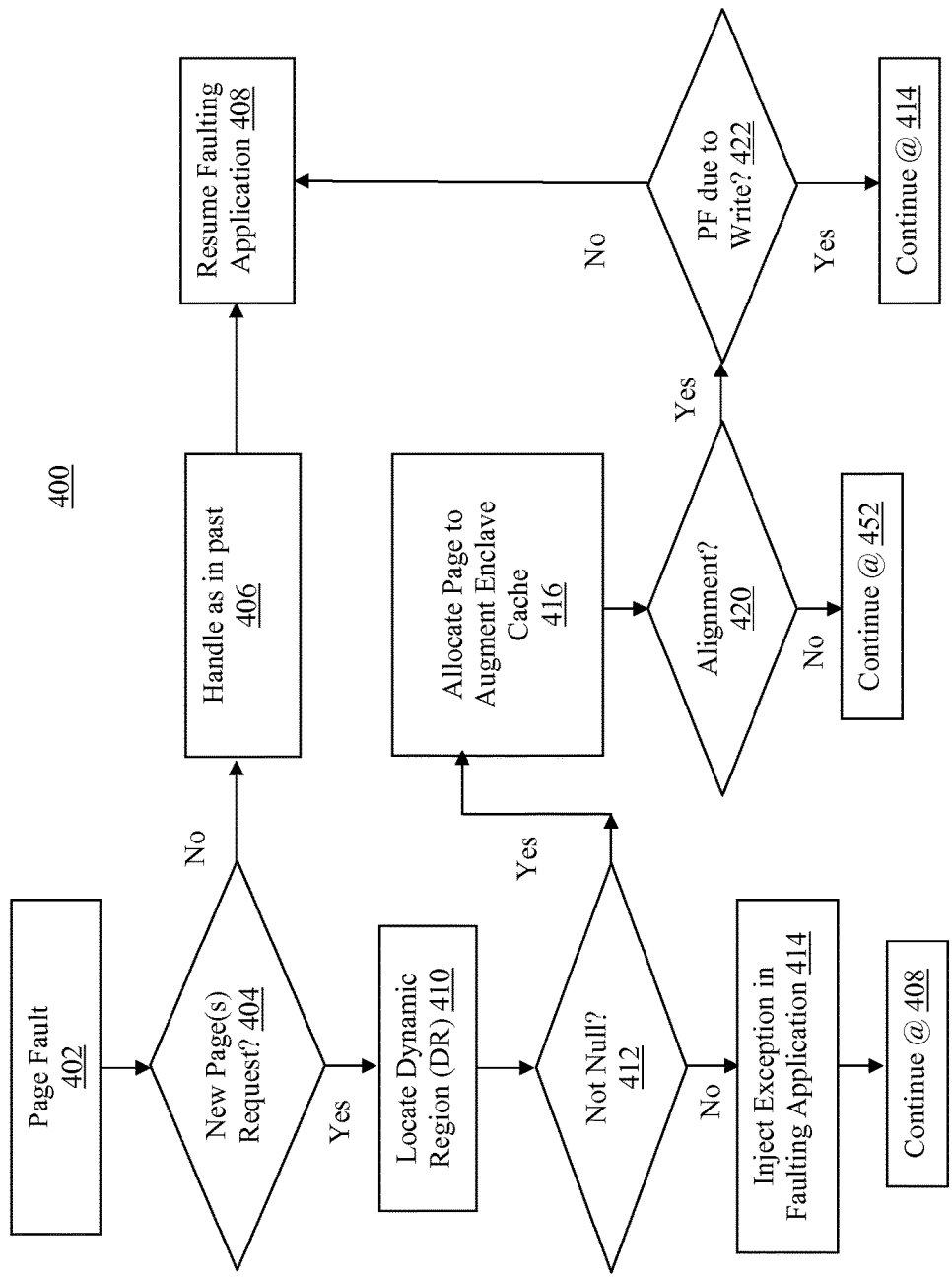
FIGS. 4 and 5 illustrate an example process of the exception handler for dynamically adding one or more cache pages to an application execution enclave, according to various embodiments.
Figure 5:
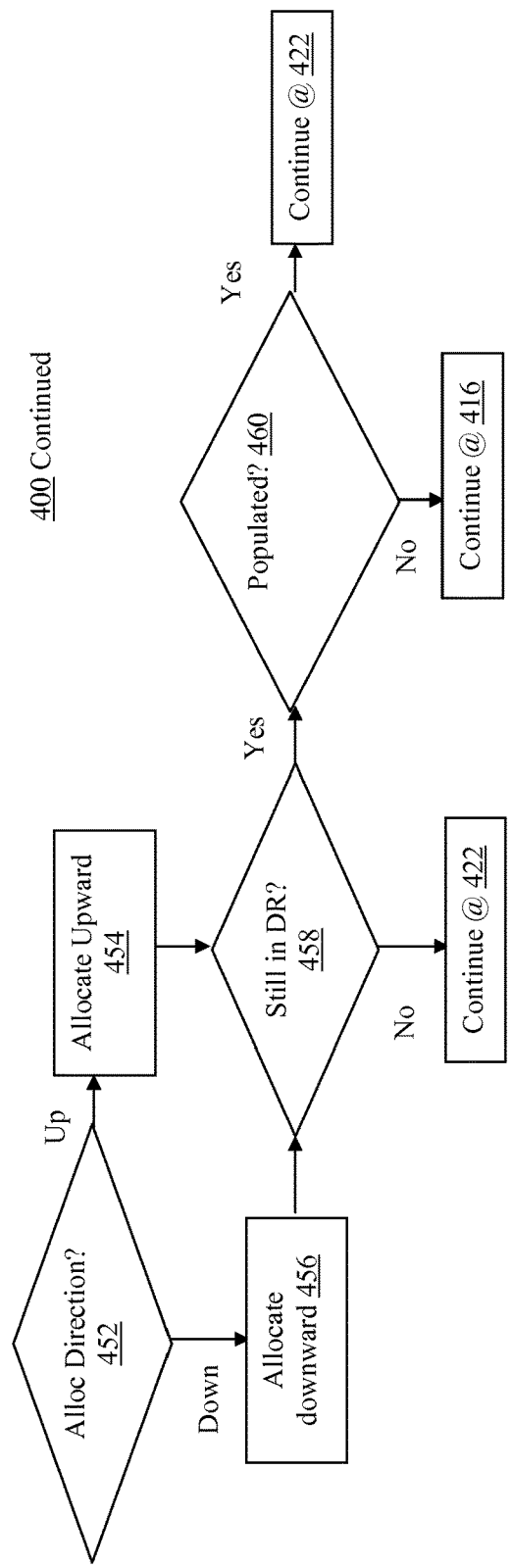

Referring now to FIGS. 4 and 5, wherein an example process for an exception handler to dynamically add one or more memory pages to a memory page cache of an application execution enclave, according to various embodiments, is illustrated. As shown, process 400 for dynamically adding one or more memory pages to an application execution enclave may include operations performed at blocks 402-460. The operations at block 402-460 may be performed, e.g., by exception handler 128 of FIG. 1.

Process 400 may start at block 402. At block 402, a memory page fault exception may be received. Next, at block 404, a determination may be made on whether the memory page fault exception was intentionally or unknowingly triggered to request one or more additional memory pages to a memory page cache of an application enclave. The determination may be made, e.g., based at least in part on a page fault code (PFEC) of the memory page fault (#PF). If the memory page fault exception was not triggered to request one or more additional memory pages to a memory page cache of an application enclave, at block 406, the memory page fault may be handled as in the past. For example, if the memory page fault is caused because the referenced memory page was paged out, the missing memory page may be fetched and be paged back into the memory. On handling the conventional memory page fault, e.g., paging back a missing memory page, at block 408, the faulting application, i.e., the application that triggered the memory page fault, may be resumed. Thereafter, process 400 may end. In some embodiments, at block 406, depending on OS runtime 112, an exception may be injected into the faulting application, before proceeding to block 408 to resume the faulting application.

Back at block 404, if a result of the determination indicates that the memory page fault was triggered to request one or more additional memory pages to a memory page cache of an application execution enclave, at block 410, a dynamic region of the application execution enclave may be located. In embodiments, the PFEC may include information on locations where information about the dynamic regions of an execution enclave may be found. Next at block 412, a determination may be made to confirm a located dynamic region is not null. If a result of the determination is negative, i.e., the dynamic region is null, at block 414, an exception (e.g., SIGBUS if OS 112 is Linux) may be injected into the faulting application. Thereafter, process 400 may continue at block 408 as earlier described. In embodiments, e.g., SGX embodiments, operations at 410 and 412 may be integrally performed as part of the operations at block 404.

If a result of the determination is positive, i.e., the dynamic region is not null, at block 416, one or more new memory pages may be allocated and mapped to the execution conclave to augment the memory page cache previously allocated to the execution enclave. In embodiments, the earlier described memory page address, memory page type, memory page mask and flag information of the dynamic region may be gathered and used in the allocation and mapping. In SGX embodiments, the EAUG instruction may be executed with the memory page type as a parameter at the memory page address.

Next, at block 420, a check may be performed to determine whether the code/data sections/segments are aligned. If the code/data sections/segments are aligned, at block 422, another check may be performed to determine whether the page fault is caused by a write operation. If the result of the determination is negative, i.e., the page fault is not caused by a write operation, process 400 may continue at block 408, as earlier described. If the result of the determination is positive, i.e., the page fault is caused by a write operation, process 400 may continue at block 414, and then at block 408, as earlier described. The rationale of block 420 is that in SGX embodiments, EACCEPT causes Read access to a page, and that no Read access should be performed on a newly allocated page (which is considered as uninitialized data). In order words, a Read access to a newly allocated page is either by EACCEPT or a software error.

Back at block 420, if the result of the alignment indicates the code/data sections/segments are not aligned, i.e., there is space for further allocation, process 400 may continue at block 452. At block 452, the direction of allocation, i.e., whether the memory pages are to be allocated (grow) in an upward direction (with increasing addresses) or a downward direction (with decreasing addresses) may be determined, e.g., by examining the flag of the dynamic region. Based on a result of the direction determination, process 400 may proceed to block 454 or 456 accordingly. At block 454, a new memory page in the upward direction may be allocated and mapped (e.g., by setting page address+=page size). At block 456, a new memory page in the downward direction may be allocated and mapped (e.g., by setting page address-=page size). In embodiments, in addition to allocation in an upward or downward direction, allocation of a predefined region may also be supported. Examples of a pre-defined region may include, but are not limited to, a region as small as a page or as large as a module or module section/segment.

Next, at block 458, a check may be performed to determine whether the page address calculation is still within the dynamic region. If a result of the determination indicates the page address calculation is no longer within the dynamic region, process 400 may continue at block 422 as earlier described. If a result of the determination indicates the page address calculation is still within the dynamic region, at block 460, another check may be performed to determine whether the page address is populated. If a result of the determination indicates the page address is not populated, process 400 may return to block 416 for further allocation, as earlier described. If a result of the determination indicates that the page address is populated, process 400 may return to block 422, and continue therefrom, as earlier described.

Referring back to block 420, in embodiments, the alignment check may be performed by performing an AND operation on the memory page address and the memory page mask. Thus, when the memory page mask is set to zero, process 400 will proceed to block 422, resulting in only one new memory page allocated per page fault. This might be useful for discrete allocation, such as populating bound table pages for protected memory. Similarly, by setting memory page mask to minus 0XF000, process 400 will proceed to block 422, whenever memory page address is 64K aligned, likewise resulting in only one new memory page allocated per page fault. This might be useful, for instance, when allocating memory pages to host 64K aligned code segments loaded at runtime. Additionally, the alignment check may be effectively bypassed by setting the memory page mask to all ones. This might be useful for continuous allocation, such as heaps and stacks, ensuring the gap between the faulting address and the closest populated page within the same dynamic region will always be filled.

Referring back to block 454/456, as described earlier, in SGX embodiments, the application execution enclave may acknowledge the allocation of each new memory page by executing the EACCEPT instruction. In embodiments, the enclave may execute the EACCEPT instruction for the new allocated memory page that is farthest from the committed area first. For example, when extending by m pages a heap currently ending at addr (i.e., requesting pages at addr, addr+0x1000, addr+0x2000, . . . , addr+(m−1)*0x1000), the enclave may EACCEPT addr+(m−1)*0x1000 first, which will cause all m pages to be populated by in the first #PF, and thus avoid further #PFs by subsequent EACCEPTs.

Thus, a novel approach for dynamically allocating additional cache pages to an application execution enclave has been described. The approach has at least the following advantages:

More efficient—The overhead of each additional memory page request is a memory page fault, which typically costs less than a system call (via the host application of the application execution enclave).

More secure—By avoiding the system call via the host application of the execution enclave, the number of paths into or out of the application execution enclave are reduced, thereby reducing the complexity of the enclave interface.

Simpler code—code to otherwise deal with facilitating the system call via the host application of the application execution enclave is no longer necessary.

More flexible—there are no inherent restrictions to the disclosed approach. The approach works in both normal and exception paths.

Figure 6:
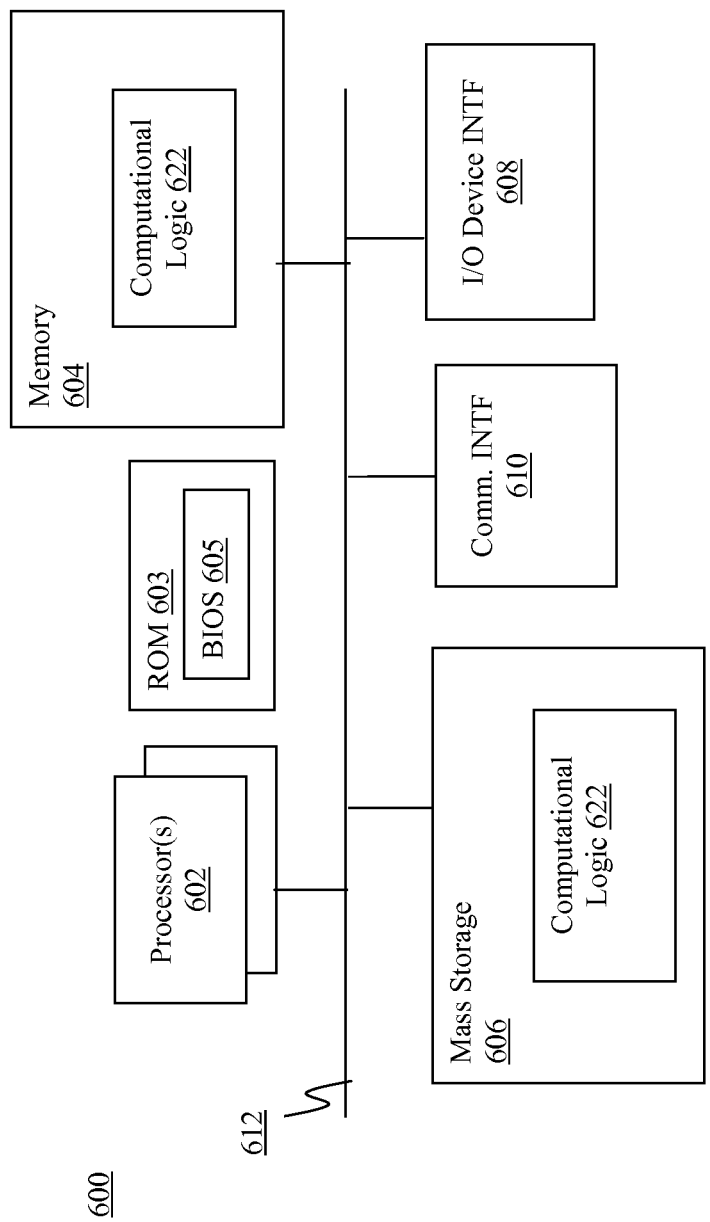
FIG. 6 illustrates an example computer system suitable for use to practice aspects of the present disclosure, according to various embodiments.

FIG. 6 illustrates an example computer system that may be suitable for use to practice selected aspects of the present disclosure. As shown, computer 600 may include one or more processors or processor cores 602 with application execution enclave support, read-only memory (ROM) 603, and system memory 604. For the purpose of this application, including the claims, the term "processor" refers to a physical processor, and the terms "processors" and "processor cores" may be considered synonymous, unless the context clearly requires otherwise. Additionally, computer system 600 may include mass storage devices 606. Example of mass storage devices 606 may include, but are not limited to, tape drives, hard drives, compact disc read-only memory (CD-ROM) and so forth. Further, computer system 600 may include input/output devices 608 (such as display, keyboard, cursor control and so forth) and communication interfaces 610 (such as network interface cards, modems and so forth). The elements may be coupled to each other via system bus 612, which may represent one or more buses. In the case of multiple buses, they may be bridged by one or more bus bridges (not shown).

Each of these elements may perform its conventional functions known in the art. In particular, ROM 603 may include basic input/output system services (BIOS) 605, including the PM data package provision service, as earlier described. System memory 604 and mass storage devices 606 may be employed to store a working copy and a permanent copy of the programming instructions implementing the operations associated with applications 114 and/or OS runtime 112, including exception handler 128, as earlier described, collectively referred to as computational logic 622. The various elements may be implemented by assembler instructions supported by processor(s) 602 or high-level languages, such as, for example, C, that can be compiled into such instructions.

The number, capability and/or capacity of these elements 610-612 may vary, depending on whether computer system 600 is used as a mobile device, such as a wearable device, a smartphone, a computer tablet, a laptop and so forth, or a stationary device, such as a desktop computer, a server, a game console, a set-top box, an infotainment console, and so forth. Otherwise, the constitutions of elements 610-612 are known, and accordingly will not be further described.

Figure 7:
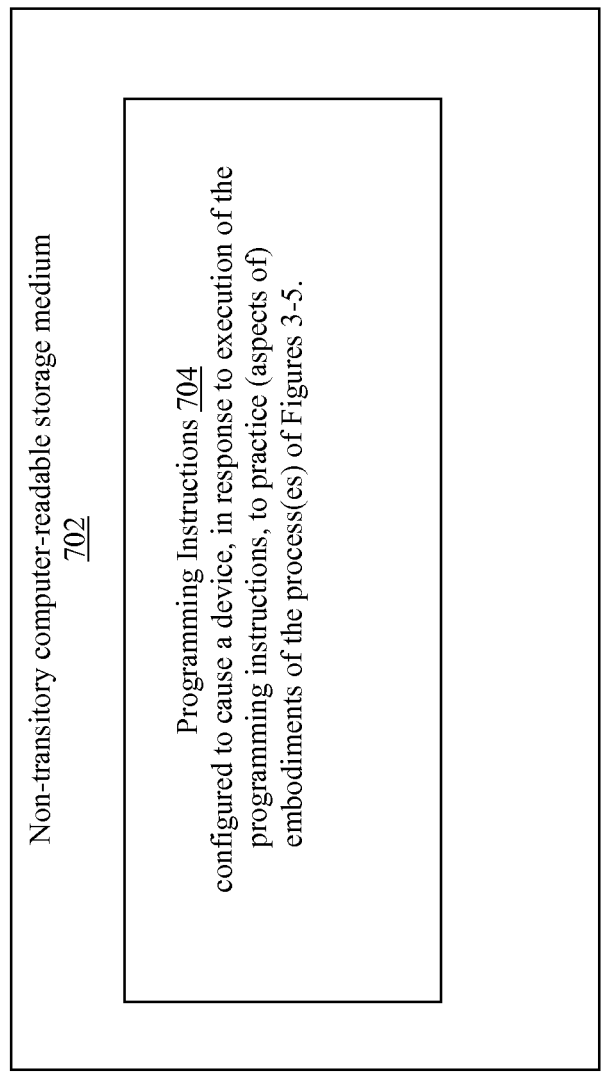
FIG. 7 illustrates a storage medium having instructions for practicing methods described with references to FIGS. 3-5, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., computer 600, in response to execution of the programming instructions, to implement (aspects of) OS runtime 112, e.g., exception handler 128, and/or applications 114. In alternate embodiments, programming instructions 704 may be disposed on multiple computer-readable non-transitory storage media 702 instead. In still other embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of processors 602 may be packaged together with memory having aspects of OS runtime 112, e.g., exception handler 128. For one embodiment, at least one of processors 602 may be packaged together with memory having aspects of OS runtime 112, e.g., exception handler 128, to form a System in Package (SiP). For one embodiment, at least one of processors 602 may be integrated on the same die with memory having aspects of OS runtime 112, e.g., exception handler 128. For one embodiment, at least one of processors 602 may be packaged together with memory having aspects of OS runtime 112, e.g., exception handler 128, to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for computing, comprising: one or more processors with supports for application execution enclaves; memory coupled with the one or more processors to be organized into a plurality of memory pages; and an exception handler to be operated by the one or more processors to handle memory page fault exceptions, wherein to handle memory page fault exceptions may include to handle a memory page fault triggered to request additional allocation of one or more memory pages to a memory page cache of an execution enclave of an application of the apparatus.

Example 2 maybe example 1, wherein the supports for application execution enclaves may include supports for an application execution enclave to acknowledge acceptance of an allocation of one or more memory pages to the memory page cache of the application execution enclave; wherein the memory page fault to request additional allocation of one or more memory pages to a memory page cache of an execution enclave of an application may be triggered by issuance, by the application execution enclave, of an acknowledgement to an allocation of one or more memory pages at a vacant address, or triggered by an overflow of a heap or stack of the application execution enclave.

Example 3 maybe example 2; wherein the vacant address may be a starting address of where the application execution enclave wants one or more additional memory pages to be mapped.

Example 4 maybe example 2, wherein the exception handler, on handling the memory page fault triggered to request additional allocation of one or more memory pages to the memory page cache of the execution enclave of the application, may resume the application execution enclave to cause the acknowledgement to be retried.

Example 5 maybe any one of examples 2-4, wherein the supports for application execution enclaves may include supports to augment memory page allocation to a memory page cache of an application execution enclave with one or more additional memory pages; wherein the page exception handler may handle the memory page allocation request using the augmentation support.

Example 6 maybe example 5, wherein the exception handler may further determine whether a faulting address associated with a memory page fault points to a previously allocated memory page that has been paged out of the memory, and on determination that the faulting address points to a paged out memory page, may cause the paged out memory page to be paged back into the memory.

Example 7 maybe example 5, wherein the exception handler may determine whether the staring address is within a dynamic address range of the application execution enclave, and on determination that the vacant address is not within a dynamic address range of the application execution enclave, the exception handler may inject an exception to the faulting application, and resume the faulting application.

Example 8 maybe example 5, wherein the exception handler may determine whether the starting address is within a dynamic address range of the application execution enclave, and on determination that the vacant address is within a dynamic address range of the application execution enclave, the exception handler may retrieve at least one of a memory page type, a memory address mask or a memory page growth direction indicator of the dynamic address range.

Example 9 maybe example 8, wherein on retrieval of the at least one of a memory page type, a memory address mask or a memory page growth direction indicator of the dynamic address range, the exception handler may cause the augmentation support to allocate one or more memory pages to the memory page cache of the application execution enclave using the retrieved at least one of a memory page type, a memory address mask or a memory page growth direction indicator, starting at the vacant address.

Example 10 maybe example 9, wherein the exception handler may further check for code/data section/segment alignment.

Example 11 maybe example 10, wherein when a result of the checking indicates code/data section/segment is not aligned, the exception handler may further successively add or subtract the memory page size from the starting address to successively allocate the one or more memory pages to the memory page cache of the application execution enclave, in a selected on of an upward or downward address direction.

Example 12 maybe example 10, wherein the retrieved at least one of a memory page type, a memory address mask or a memory page growth direction indicator may include the memory address mask, and the exception handler may further compare the starting address with the memory page mask to check for code/data section/segment alignment.

Example 13 maybe example 12, wherein based at least in part on a result of the comparison of the starting address with the memory page mask, the exception handler may further successively add or subtract the memory page size from the starting address to successively allocate the one or more memory pages to the memory page cache of the application execution enclave, based at least in part on the memory page growth direction indicator.

Example 14 maybe example 10, wherein the exception handler may further determine whether the memory page fault is caused by a write attempt; on determination that the memory page fault is caused by a write attempt, the exception handler may inject an exception into faulting application, and thereafter resume the faulting application; and on determination that the memory page fault is not caused by a write attempt, the exception handler may resume the faulting application.

Example 15 may be a method for computing, comprising: receiving, by an exception handler of a computing device, a memory page fault exception triggered to request additional allocation of one or more memory pages to a memory page cache of an execution enclave of an application operating on one or more processors of the computing device, wherein the one or more processors support application execution enclaves; and handling, by the exception handler, the memory page fault exception, causing the requested one or more memory pages to the allocated to the memory page cache of the execution enclave.

Example 16 maybe example 15, wherein the supports for application execution enclaves may include supports for an application execution enclave to acknowledge acceptance of an allocation of one or more memory pages to the memory page cache of the application execution enclave; wherein the memory page fault to request additional allocation of one or more memory pages to a memory page cache of an execution enclave of an application is triggered by issuance, by the application execution enclave, of an acknowledgement to an allocation of one or more memory pages at a vacant address, or triggered by an overflow of a heap or stack of the application execution enclave.

Example 17 maybe example 16; wherein the vacant address may be a starting address of where the application execution enclave wants one or more additional memory pages to be mapped.

Example 18 maybe example 16, further comprising, on servicing the memory page fault triggered to request additional allocation of one or more memory pages to the memory page cache of the execution enclave of the application, resuming the application execution enclave to cause the acknowledgement to be retried.

Example 19 maybe any one of examples 16-18, wherein the supports for application execution enclaves may include supports to augment memory page allocation to a memory page cache of an application execution enclave with one or more additional memory pages; wherein handling the memory page allocation request may comprise using the augmentation support.

Example 20 maybe example 19, further comprising determining whether a faulting address associated with a memory page fault points to a previously allocated memory page that has been paged out of the memory, and on determining that the faulting address points to a paged out memory page, causing the paged out memory page to be paged back into the memory.

Example 21 maybe example 19, further comprising determining whether the staring address is within a dynamic address range of the application execution enclave, and on determining that the vacant address is not within a dynamic address range of the application execution enclave, injecting an exception to the faulting application, and resuming the faulting application.

Example 22 maybe example 19, further comprising determining whether the starting address is within a dynamic address range of the application execution enclave, and on determining that the vacant address is within a dynamic address range of the application execution enclave, retrieving at least one of a memory page type, a memory address mask or a memory page growth direction indicator of the dynamic address range.

Example 23 maybe example 22, wherein on retrieving the at least one of a memory page type, a memory address mask or a memory page growth direction indicator of the dynamic address range, causing the augmentation support to allocate one or more memory pages to the memory page cache of the application execution enclave using the retrieved at least one of a memory page type, a memory address mask or a memory page growth direction indicator, starting at the vacant address.

Example 24 maybe example 21, further comprising checking for code/data section/segment alignment.

Example 25 maybe example 24, further comprising when a result of the checking indicates code/data section/segment is not aligned, successively adding or subtracting the memory page size from the starting address to successively allocate the one or more memory pages to the memory page cache of the application execution enclave, in a selected on of an upward or downward address direction.

Example 26 maybe example 24, wherein the retrieved at least one of a memory page type, a memory address mask or a memory page growth direction indicator may include the memory address mask, and handling may comprise comparing the starting address with the memory page mask to check for code/data section/segment alignment.

Example 27 maybe example 26, further comprising based at least in part on a result of the comparison of the starting address with the memory page mask, successively adding or subtracting the memory page size from the starting address to successively allocate the one or more memory pages to the memory page cache of the application execution enclave, based at least in part on the memory page growth direction indicator.

Example 28 maybe example 24, further comprising determining whether the memory page fault is caused by a write attempt; on determining that the memory page fault is caused by a write attempt, injecting an exception into faulting application, and thereafter resuming the faulting application; and on determining that the memory page fault is not caused by a write attempt, resuming the faulting application.

Example 29 may be one or more computer-readable media comprising instructions that cause a computing device, in response to execution of the instructions by one or more processors of the computing device, to provide an exception handler, to: receive a memory page fault exception triggered to request additional allocation of one or more memory pages to an execution enclave of an application operating on the one or more processors, wherein the one or more processors support application execution enclaves; and handle the memory page fault exception, wherein to handle may include to cause the requested one or more memory pages to be allocated to the memory page cache of the execution enclave.

Example 30 maybe example 29, wherein the supports for application execution enclaves may include supports for an application execution enclave to acknowledge acceptance of an allocation of one or more memory pages to the memory page cache of the application execution enclave; wherein the memory page fault to request additional allocation of one or more memory pages to a memory page cache of an execution enclave of an application is triggered by issuance, by the application execution enclave, of an acknowledgement to an allocation of one or more memory pages at a vacant address, or triggered by an overflow of a heap or stack of the application execution enclave.

Example 31 maybe example 30; wherein the vacant address may be a starting address of where the application execution enclave wants one or more additional memory pages to be mapped.

Example 32 maybe example 30, wherein the exception handler, on servicing the memory page fault triggered to request additional allocation of one or more memory pages to the memory page cache of the execution enclave of the application, may resume the application execution enclave to cause the acknowledgement to be retried.

Example 33 maybe any one of examples 30-32, wherein the supports for application execution enclaves may include supports to augment memory page allocation to a memory page cache of an application execution enclave with one or more additional memory pages; wherein the page exception handler handles the memory page allocation request using the augmentation support.

Example 34 maybe example 33, wherein the exception handler may further determine whether a faulting address associated with a memory page fault points to a previously allocated memory page that has been paged out of the memory, and on determination that the faulting address points to a paged out memory page, cause the paged out memory page to be paged back into the memory.

Example 35 maybe example 33, wherein the exception handler may determine whether the staring address is within a dynamic address range of the application execution enclave, and on determination that the vacant address is not within a dynamic address range of the application execution enclave, the exception handler may inject an exception to the faulting application, and resume the faulting application.

Example 36 maybe example 33, wherein the exception handler may determine whether the starting address is within a dynamic address range of the application execution enclave, and on determination that the vacant address is within a dynamic address range of the application execution enclave, the exception handler may retrieve at least one of a memory page type, a memory address mask or a memory page growth direction indicator of the dynamic address range.

Example 37 maybe example 36, wherein on retrieval of the at least one of a memory page type, a memory address mask or a memory page growth direction indicator of the dynamic address range, the exception handler may cause the augmentation support to allocate one or more memory pages to the memory page cache of the application execution enclave using the retrieved at least one of a memory page type, a memory address mask or a memory page growth direction indicator, starting at the vacant address.

Example 38 maybe example 35, wherein the exception handler may further check for code/data section/segment alignment.

Example 39 maybe example 38, when a result of the checking indicates code/data section/segment is not aligned, the exception handler may further successively add or subtract the memory page size from the starting address to successively allocate the one or more memory pages to the memory page cache of the application execution enclave, in a selected on of an upward or downward address direction.

Example 40 maybe example 38, wherein the retrieved at least one of a memory page type, a memory address mask or a memory page growth direction indicator may include the memory address mask, and the exception handler may further compare the starting address with the memory page mask to check for code/data section/segment alignment.

Example 41 maybe example 40, wherein based at least in part on a result of the comparison of the starting address with the memory page mask, the exception handler may further successively add or subtract the memory page size from the starting address to successively allocate the one or more memory pages to the memory page cache of the application execution enclave, based at least in part on the memory page growth direction indicator.

Example 42 maybe example 38, wherein the exception handler may further determine whether the memory page fault is caused by a write attempt; on determination that the memory page fault is caused by a write attempt, the exception handler may inject an exception into faulting application, and thereafter resume the faulting application; and on determination that the memory page fault is not caused by a write attempt, the exception handler may resume the faulting application.

Example 43 maybe an apparatus for computing, comprising: exception receiving means for receiving a memory page fault exception triggered to request additional allocation of one or more cache pages to a memory page cache of an execution enclave of an application operating on one or more processors of the computing device, wherein the one or more processors support application execution enclaves; and exception handling means for handling the memory page fault exception, causing the requested one or more memory pages to the allocated to the execution enclave.

Example 44 maybe example 43, wherein the supports for application execution enclaves may include supports for an application execution enclave to acknowledge acceptance of an allocation of one or more memory pages to the memory page cache of the application execution enclave; wherein the memory page fault to request additional allocation of one or more memory pages to a memory page cache of an execution enclave of an application is triggered by issuance, by the application execution enclave, of an acknowledgement to an allocation of one or more memory pages at a vacant address, or triggered by an overflow of a heap or stack of the application execution enclave.

Example 45 maybe example 44; wherein the vacant address may be a starting address of where the application execution enclave wants one or more additional memory pages to be mapped.

Example 46 maybe example 44, further comprising means for resuming the application execution enclave to cause the acknowledgement to be retried, on servicing the memory page fault triggered to request additional allocation of one or more memory pages to the memory page cache of the execution enclave of the application.

Example 47 maybe any one of examples 44-46, wherein the supports for application execution enclaves may include supports to augment memory page allocation to a memory page cache of an application execution enclave with one or more additional memory pages; wherein exception handling means may comprise means for using the augmentation support.

Example 48 maybe example 47, further comprising means for determining whether a faulting address associated with a memory page fault points to a previously allocated memory page that has been paged out of the memory, and means for causing the paged out memory page to be paged back into the memory, on determining that the faulting address points to a paged out memory page.

Example 49 maybe example 47, further comprising means for determining whether the staring address is within a dynamic address range of the application execution enclave, and means for injecting an exception to the faulting application, and resuming the faulting application, on determining that the vacant address is not within a dynamic address range of the application execution enclave.

Example 50 maybe example 47, further comprising means for determining whether the starting address is within a dynamic address range of the application execution enclave, and means for retrieving at least one of a memory page type, a memory address mask or a memory page growth direction indicator of the dynamic address range.

Example 51 maybe example 50, further comprising means for causing, on determining that the vacant address is within a dynamic address range of the application execution enclave, the augmentation support to allocate one or more memory pages to the memory page cache of the application execution enclave using the retrieved at least one of a memory page type, a memory address mask or a memory page growth direction indicator, starting at the vacant address, on retrieving the at least one of a memory page type, a memory address mask or a memory page growth direction indicator of the dynamic address range.

Example 52 maybe example 51, further comprising means for checking for code/data section/segment alignment.

Example 53 maybe example 52, further comprising means for successively adding or subtracting the memory page size from the starting address to successively allocate the one or more memory pages to the memory page cache of the application execution enclave, in a selected on of an upward or downward address direction, when a result of the checking indicates code/data section/segment is not aligned.

Example 54 maybe example 52, wherein the retrieved at least one of a memory page type, a memory address mask or a memory page growth direction indicator may include the memory address mask, and exception handling means may comprise means for comparing the starting address with the memory page mask to check for code/data section/segment alignment.

Example 55 maybe example 54, further comprising means for successively adding or subtracting the memory page size from the starting address to successively allocate the one or more memory pages to the memory page cache of the application execution enclave, in accordance with at least in part on the memory page growth direction indicator, based at least in part on a result of the comparison of the starting address with the memory page mask.

Example 56 maybe example 52, further comprising means for determining whether the memory page fault is caused by a write attempt; means for injecting an exception into faulting application, and thereafter resuming the faulting application, on determining that the memory page fault is caused by a write attempt; and means for resuming the faulting application, on determining that the memory page fault is not caused by a write attempt.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
one or more processors with support for application execution enclaves;
memory coupled with the one or more processors to be organized into a plurality of memory pages; and
an exception handler to be operated by the one or more processors to handle memory page fault exceptions, wherein to handle memory page fault exceptions includes to handle a memory page fault triggered to request additional allocation of one or more memory pages to a memory page cache of an application execution enclave of the apparatus; wherein
the support for application execution enclaves include support for the application execution enclave to acknowledge acceptance of an allocation of one or more memory pages to the memory page cache of the application execution enclave; wherein the memory page fault to request additional allocation of one or more memory pages to a memory page cache of the application execution enclave is triggered by issuance, by the application execution enclave without a prior request for additional allocation of one or more memory pages by a system call made by a host application of the application execution enclave, of an acknowledgement to an allocation of one or more memory pages at a vacant address.

2. The apparatus of claim 1, wherein the memory page fault further comprises a page fault code to indicate that the memory page fault is to request one or more additional memory pages to the memory page cache of the application execution enclave.

3. The apparatus of claim 1, wherein the vacant address is a starting address of where the application execution enclave wants one or more additional memory pages to be mapped.

4. The apparatus of claim 1, wherein the exception handler, on handling the memory page fault triggered to request additional allocation of one or more memory pages to the memory page cache of the application execution enclave, is to resume the application execution enclave to cause the acknowledgement to be retried.

5. The apparatus of claim 1, wherein the support for application execution enclaves include support to augment memory page allocation to a memory page cache of the application execution enclave with one or more additional memory pages; wherein the page exception handler handles the memory page allocation request using the augmentation support.

6. The apparatus of claim 5, wherein the exception handler is to further determine whether a faulting address associated with a memory page fault points to a previously allocated memory page that has been paged out of the memory, and on determination that the faulting address points to a paged out memory page, cause the paged out memory page to be paged back into the memory.

7. The apparatus of claim 5, wherein the exception handler is to determine whether the starting address is within a dynamic address range of the application execution enclave, and on determination that the vacant address is not within a dynamic address range of the application execution enclave, the exception handler is to inject an exception to a faulting application, and resume the faulting application.

8. The apparatus of claim 5, wherein the exception handler is to determine whether the starting address is within a dynamic address range of the application execution enclave, and on determination that the vacant address is within a dynamic address range of the application execution enclave, the exception handler is to retrieve at least one of a memory page type, a memory address mask or a memory page growth direction indicator of the dynamic address range.

9. The apparatus of claim 8, wherein on retrieval of the at least one of a memory page type, a memory address mask or a memory page growth direction indicator of the dynamic address range, the exception handler is to cause the augmentation support to allocate one or more memory pages to the memory page cache of the application execution enclave using the retrieved at least one of a memory page type, a memory address mask or a memory page growth direction indicator, starting at the vacant address.

10. The apparatus of claim 9, wherein the exception handler is to further check for code/data section/segment alignment.

11. The apparatus of claim 10, wherein when a result of the checking indicates code/data section/segment is not aligned, the exception handler is to further successively add or subtract a memory page size from the starting address to successively allocate the one or more memory pages to the memory page cache of the application execution enclave, in a selected one of an upward or downward address direction.

12. The apparatus of claim 10, wherein the retrieved at least one of a memory page type, a memory address mask or a memory page growth direction indicator includes the memory address mask, and the exception handler is to further compare the starting address with the memory address mask to check for code/data section/segment alignment; wherein based at least in part on a result of the comparison of the starting address with the memory address mask, the exception handler is to further successively add or subtract a memory page size from the starting address to successively allocate the one or more memory pages to the memory page cache of the application execution enclave, based at least in part on the memory page growth direction indicator.

13. The apparatus of claim 10, wherein the exception handler is to further determine whether the memory page fault is caused by a write attempt; on determination that the memory page fault is caused by a write attempt, the exception handler is to inject an exception into a faulting application, and thereafter resume the faulting application; and on determination that the memory page fault is not caused by a write attempt, the exception handler is to resume the faulting application.

14. A method for computing, comprising:
receiving, by an exception handler of a computing device, a memory page fault exception triggered to request additional allocation of one or more memory pages to a memory page cache of an application execution enclave operating on one or more processors of the computing device, wherein the one or more processors support application execution enclaves; and
handling, by the exception handler, the memory page fault exception, causing the requested one or more memory pages to be a allocated to the memory page cache of the execution enclave; wherein
the support for application execution enclaves include support for the application execution enclave to acknowledge acceptance of an allocation of one or more memory pages to the memory page cache of the application execution enclave; wherein the memory page fault to request additional allocation of one or more memory pages to a memory page cache of the application execution enclave of an application is triggered by issuance, by the application execution enclave without a prior request for additional allocation of one or more memory pages by a system call made by a host application of the application execution enclave, of an acknowledgement to an allocation of one or more memory pages at a vacant address.

15. The method of claim 14, wherein the memory page fault further comprises a page fault code to indicate that the memory page fault is to request one or more additional memory pages to the memory page cache of the application execution enclave.

16. The method of claim 14, wherein the support for application execution enclaves include support to augment memory page allocation to a memory page cache of the application execution enclave with one or more additional memory pages; wherein handling the memory page allocation request comprises using the augmentation support.

17. One or more non-transitory computer-readable media comprising instructions that cause a computing device, in response to execution of the instructions by one or more processors of the computing device, to provide an exception handler, to:
receive a memory page fault exception triggered to request additional allocation of one or more memory pages to an application execution enclave operating on the one or more processors, wherein the one or more processors support application execution enclaves; and
handle the memory page fault exception, wherein to handle include to cause the requested one or more memory pages to be allocated to a memory page cache of the application execution enclave; wherein
the support for application execution enclaves include support for the application execution enclave to acknowledge acceptance of the allocation of one or more memory pages to the memory page cache of the application execution enclave; wherein the memory page fault to request additional allocation of one or more memory pages to the memory page cache of an application execution enclave is triggered by issuance, by the application execution enclave without a prior request for additional allocation of one or more memory pages by a system call made by a host application of the application execution enclave, of an acknowledgement to an allocation of one or more memory pages at a vacant address.

18. The one or more non-transitory computer-readable media of claim 17, wherein the memory page fault further comprises a page fault code to indicate that the memory page fault is to request one or more additional memory pages to the memory page cache of the application execution enclave.

19. The one or more non-transitory computer-readable media of claim 17, wherein the vacant address is a starting address of where the application execution enclave wants one or more additional memory pages to be mapped; and wherein the exception handler, on servicing the memory page fault triggered to request additional allocation of one or more memory pages to the memory page cache of the application execution enclave, is to resume the application execution enclave to cause the acknowledgement to be retried.

20. The one or more non-transitory computer-readable media of claim 17, wherein the support for application execution enclaves include support to augment memory page allocation to the memory page cache of the application execution enclave with one or more additional memory pages; wherein the page exception handler handles the memory page allocation request using the augmentation support.

21. The one or more non-transitory computer-readable media of claim 20, wherein the exception handler is to determine whether a starting address is within a dynamic address range of the application execution enclave, and on determination that the vacant address is not within a dynamic address range of the application execution enclave, the exception handler is to inject an exception to the faulting application, and resume the faulting application; and on determination that the vacant address is within a dynamic address range of the application execution enclave, the exception handler is to retrieve at least one of a memory page type, a memory address mask or a memory page growth direction indicator of the dynamic address range.

22. The one or more non-transitory computer-readable media of claim 21, wherein on retrieval of the at least one of a memory page type, a memory address mask or a memory page growth direction indicator of the dynamic address range, the exception handler is to cause the augmentation support to allocate one or more memory pages to the memory page cache of the application execution enclave using the retrieved at least one of a memory page type, a memory address mask or a memory page growth direction indicator, starting at the vacant address.

23. The one or more non-transitory computer-readable media of claim 21, wherein the exception handler is to further check for code/data section/segment alignment.

24. The one or more non-transitory computer-readable media of claim 23, when a result of the checking indicates code/data section/segment is not aligned, the exception handler is to further successively add or subtract a memory page size from the starting address to successively allocate the one or more memory pages to the memory page cache of the application execution enclave, in a selected one of an upward or downward address direction.

25. The one or more non-transitory computer-readable media of claim 23, wherein the retrieved at least one of a memory page type, a memory address mask or a memory page growth direction indicator includes the memory address mask, and the exception handler is to further compare the starting address with the memory address mask to check for code/data section/segment alignment; wherein based at least in part on a result of the comparison of the starting address with the memory address mask, the exception handler is to further successively add or subtract a memory page size from the starting address to successively allocate the one or more memory pages to the memory page cache of the application execution enclave, based at least in part on the memory page growth direction indicator.

\* \* \* \* \*